(12) United States Patent
Tokuchi

(10) Patent No.: US 11,025,726 B2
(45) Date of Patent: Jun. 1, 2021

(54) INFORMATION PROCESSING APPARATUS AND NON-TRANSITORY COMPUTER READABLE MEDIUM

(71) Applicant: FUJI XEROX CO., LTD., Tokyo (JP)

(72) Inventor: Kengo Tokuchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 120 days.

(21) Appl. No.: 16/048,307

(22) Filed: Jul. 29, 2018

(65) Prior Publication Data
US 2019/0173956 A1   Jun. 6, 2019

(30) Foreign Application Priority Data
Dec. 6, 2017   (JP) .............................. JP2017-234237

(51) Int. Cl.
*H04L 29/08*   (2006.01)
*G06F 9/54*   (2006.01)

(52) U.S. Cl.
CPC ............ *H04L 67/125* (2013.01); *G06F 9/547* (2013.01); *H04L 67/18* (2013.01); *H04L 67/12* (2013.01)

(58) Field of Classification Search
CPC ....... H04L 67/125; H04L 67/18; H04L 67/12; H04L 67/06; G06F 9/547; G06F 1/1684
See application file for complete search history.

(56) References Cited

U.S. PATENT DOCUMENTS

| | | | |
|---|---|---|---|
| 2010/0211951 A1 | 8/2010 | Ito | |
| 2011/0211227 A1 | 9/2011 | Sato | |
| 2013/0064089 A1* | 3/2013 | Wu | H04W 28/0289 370/235 |
| 2014/0317284 A1* | 10/2014 | Navarette | H04L 67/06 709/224 |
| 2015/0188997 A1* | 7/2015 | Park | H04L 67/125 709/201 |
| 2016/0014194 A1* | 1/2016 | Kaplinger | H04L 67/06 709/217 |
| 2018/0152977 A1* | 5/2018 | Baron | H04W 76/14 |
| 2018/0190279 A1* | 7/2018 | Anderson | G10L 15/22 |

FOREIGN PATENT DOCUMENTS

| | | |
|---|---|---|
| JP | 2010187199 | 8/2010 |
| JP | 2011166748 | 8/2011 |

* cited by examiner

*Primary Examiner* — Wing F Chan
*Assistant Examiner* — Billy H Ng
(74) *Attorney, Agent, or Firm* — JCIPRNET

(57) ABSTRACT

An information processing apparatus includes: a plurality of communication units configured to communicate with another device; and a controller configured to control execution of a coordinated function when the communication unit performs communication with the another device in accordance with a specific communication standard, wherein the coordinated function is executable with the another device and the information processing apparatus.

12 Claims, 7 Drawing Sheets

FIG.3

| FREQUENCY | 900MHz | 2.4GHz | 5GHz | 6GHz OR MORE |
|---|---|---|---|---|
| IMPORTANT STANDARD | RFID (UHF BAND) | ZigBee, BLUETOOTH | IEEE802.11a, MuLTEfire | 5G |
| MERIT | RESISTANCE TO OBSTACLES, SMALL INTERFERENCE FREQUENCY BAND | POWER SAVING, FAST COMMUNICATION SPEED, SMALL ANTENNA | SMALL INTERFERENCE FREQUENCY BAND, FAST COMMUNICATION SPEED | FAST COMMUNICATION SPEED, LARGE NUMBER OF SIMULTANEOUS CONNECTIONS OF PLURAL DEVICES, LESS DELAY |
| DEMERIT | LARGE ANTENNA, SHORT DISTANCE | MORE INTERFERENCE | VULNERABILITY TO OBSTACLES | HIGH POWER CONSUMPTION |

| COMMUNICATION METHOD | INFRARED COMMUNICATION | VISIBLE LIGHT COMMUNICATION | PROXIMITY WIRELESS (NFC) |
|---|---|---|---|
| MERIT | LOW POWER CONSUMPTION, EASY DOWNSIZING | GOOD VISIBILITY OF COMMUNICATION PATH | EASY PAIRING |
| DEMERIT | LOW VISIBILITY | HIGH DIRECTIVITY | CANNOT BE USED UNLESS IN CLOSE RANGE |

FIG.4

<COORDINATED FUNCTION MANAGEMENT TABLE>

| COMMUNICATION STANDARD/TYPE | DEVICE/SOFTWARE | CONTENT OF COORDINATED FUNCTION |
|---|---|---|
| NFC | CASH REGISTER | SETTLE |
| NFC | ... | ... |
| Wi-Fi | Wi-Fi ROUTER | DOWNLOAD |
| Wi-Fi | ... | ... |
| ·Wi-Fi<br>·BLUETOOTH | ·Wi-Fi ROUTER<br>·HEADPHONE | STREAM MUSIC DATA |
| ·Wi-Fi<br>·WIRED COMMUNICATION | ·Wi-Fi ROUTER<br>·COMPOSITE DEVICE | DOWNLOAD AND PRINT DOCUMENT DATA WITH COMPOSITE DEVICE |
| ... | ... | ... |

FIG.5

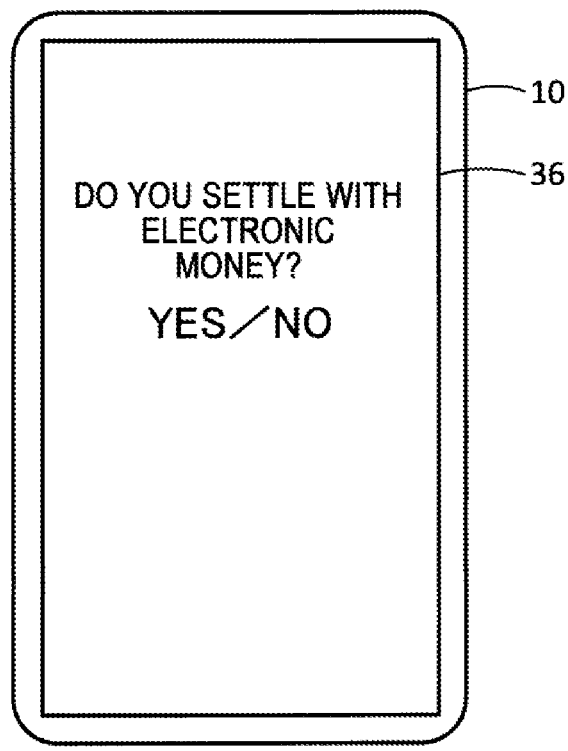

<COORDINATED FUNCTION MANAGEMENT TABLE>

| COMMUNICATION STANDARD/TYPE | DEVICE/ SOFTWARE | POSITION | CONTENT OF COORDI- NATED FUNCTION |
|---|---|---|---|
| NFC | CASH REGISTER | ... | ·SETTLE (CURRENCY CHANGES ACCORDING TO POSITION) |
| ... | ... | ... | ... |

<COORDINATED FUNCTION MANAGEMENT TABLE>

| COMMUNICATION STANDARD/TYPE | DEVICE/ SOFTWARE | CONTENT OF COORDINATED FUNCTION |
|---|---|---|
| · Wi-Fi<br>· WIRED COM-<br>MUNICATION | ① Wi-Fi ROUTER<br>② MULTIFUNCTION DEVICE | ① DOWNLOAD AND PRINT<br>② SCAN AND TRANSMIT |
| | ① MULTIFUNCTION DEVICE<br>② Wi-Fi ROUTER | ① SCAN AND TRANSMIT<br>② DOWNLOAD AND PRINT |
| ... | ... | ... |

US 11,025,726 B2

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-234237 filed Dec. 6, 2017.

BACKGROUND

Technical Field

The present invention relates to an information processing apparatus and a non-transitory computer readable medium.

SUMMARY

According to an aspect of the invention, there is provided an information processing apparatus including: plural communication units configured to communicate with another device; and a controller configured to control execution of a coordinated function when the communication unit performs communication with the another device in accordance with a specific communication standard, wherein the coordinated function is executable with the another device and the information processing apparatus.

BRIEF DESCRIPTION OF THE DRAWINGS

Exemplary embodiments of the present invention will be described in detail based on the following figures, wherein:

FIG. 3 is a diagram for explaining the characteristics of a communication standard;

FIG. 4 is a diagram illustrating a coordinated function management table;

FIG. 5 is a diagram illustrating a screen;

DETAILED DESCRIPTION

Figure 1:
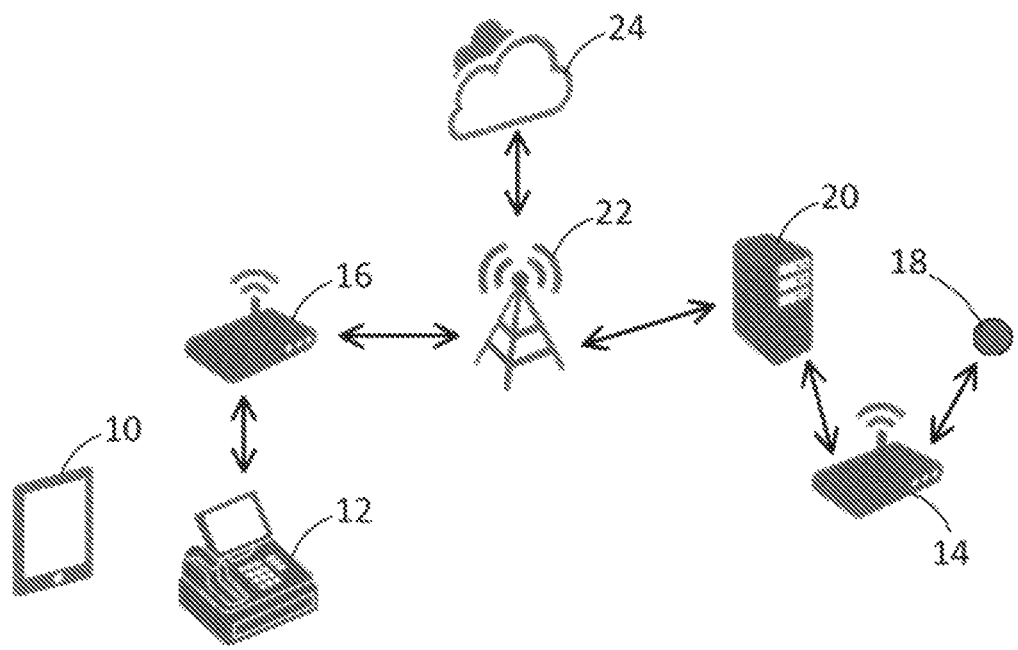
FIG. 1 is a block diagram illustrating the configuration of an information processing system according to an exemplary embodiment of the present invention.

Hereinafter, an information processing system according to the exemplary embodiment of the present invention will be described. FIG. 1 illustrates an example of the information processing system according to the present exemplary embodiment. The information processing system according to the present exemplary embodiment includes a terminal device 10 serving as an information processing apparatus and other devices, as an example. A server that provides various information and services may be included in the information processing system.

The terminal device 10 is a device such as a personal computer (PC), a tablet PC, a smartphone, or a mobile phone, and has a function of transmitting/receiving data to/from other devices. The terminal device 10 may be a wearable terminal (a wristwatch type terminal, a wristband type terminal, a spectacle type terminal, a ring type terminal, a contact lens type terminal, an intracorporeal embedded terminal, a hearable terminal, etc.). Further, the terminal device 10 may have a flexible display as a display device, such as an organic electroluminescence type display (flexible organic EL display), an electronic paper type display, a flexible liquid crystal display or the like, or flexible displays employing other display modes. The flexible display is a display with a flexibly-deformable display portion that may be, for example, bent, folded, rolled, twisted, or stretched. The terminal device 10 may be entirely formed of a flexible display or may include a flexible display and other components that are functionally or physically separated from the flexible display.

The device is a device having a function and is, for example, an image forming device having an image forming function (at least one function of a scanning function, a printing function, a copying function, a facsimile function, etc.), a PC, a tablet PC, a smartphone, a mobile phone, a robot (a humanoid robot, a non-human animal robot, other robots, etc.), a display device such as a projector and a liquid crystal display, a recording device, a reproducing device, an image capturing device such as a camera, a refrigerator, a rice cooker, a microwave oven, a coffee maker, a vacuum cleaner, a washing machine, an air conditioner, a lighting device, a clock, a surveillance camera, an automobile, a motorcycle, an aircraft (e.g., an unmanned aerial vehicle (so-called drone)), a game machine, various sensing devices (e.g., a temperature sensor, a humidity sensor, a voltage sensor, a current sensor, etc.), and the like. The device may be a device that provides an output to a user (e.g., an image forming device or a PC), or may be a device that does not provide an output to a user (e.g., a sensing device). In addition, all of the devices that perform the coordinated function described below may be devices that provide an output to a user, some devices may be devices that provide an output to a user and other devices may be devices that do not provide an output to a user, or all of the devices may be devices that do not provide an output to a user. The category of the concept of the device may include the general devices. For example, information equipment, video equipment, audio equipment, and other equipment may be included in the category of the device according to the present exemplary embodiment. Further, the device has a function of exchanging data with other devices.

In FIG. 1, a cash resister 12, routers 14 and 16, a sensing device 18, and the like are illustrated as an example of the device. Also, the server 20 may be used as a device. The routers 14 and 16 are communication devices functioning as relay devices, and are, for example, wireless routers having wireless communication functions (e.g., Wi-Fi (registered trademark) routers, etc.) and wired routers having wired communication functions. The server 20 may function as, for example, an edge server. For example, the router 16 and the server 20 are connected to a communication station 22 by wireless communication or wired communication. The router 16 and the server 20 may be connected to a so-called cloud 24 via the communication station 22 to receive data from the cloud 24 or to transmit data to the cloud 24. The cash register 12 is connected to the router 16 by wireless communication or wired communication, communication is established between the router 16 and the cash register 12, and data is transmitted and received between the router 16 and the cash register 12. The server 20 is connected to the router 16 by wireless communication or wired communication. The sensing device 18 is connected to the router 16 by wireless communication or wired communication. Further, the configuration of the device and system illustrated in FIG. 1 is merely an example, and the system may be constructed using other devices.

In the present exemplary embodiment, the terminal device 10 has a communication unit corresponding to plural communication standards, and controls notification and execution of a coordinated function that is executable using the terminal device 10 and another device when communication is performed in accordance with a specific communication standard with the other device by the communication unit.

Figure 2:
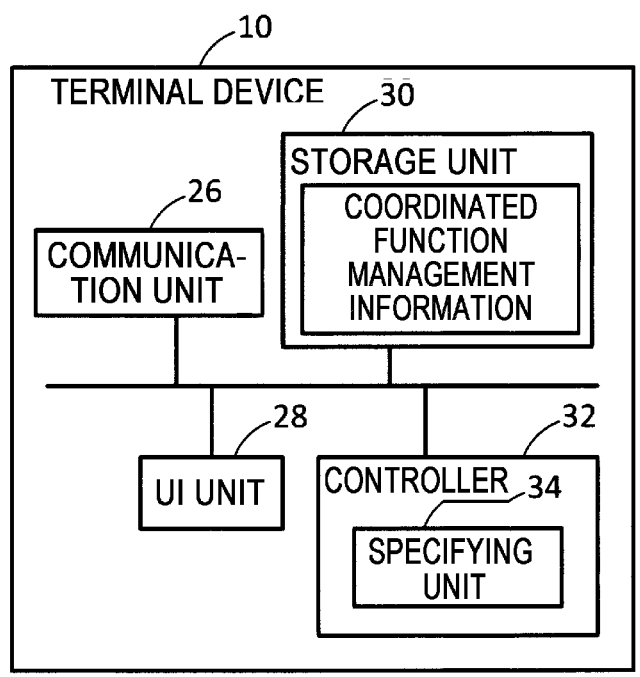
FIG. 2 is a block diagram illustrating the configuration of a terminal device.

Hereinafter, the configuration of the terminal device 10 will be described in detail with reference to FIG. 2.

The communication unit 26 is a communication interface, and has a function of transmitting data to other devices and a function of receiving data from other devices. The communication unit 26 may be a communication interface having a wireless communication function or a communication interface having a wired communication function. The communication unit 26 includes plural communication units (e.g., communication devices such as communication chips). Each communication device has a function of communicating according to its own communication standard (method). The communication standards of the respective communication devices may be different from each other, or may be identical to each other. Further, among plural communication devices, the communication standards of some of the communication devices may differ from those of the other communication devices, and the communication standards of the other communication devices may be the same. The communication unit 26 may include one communication device corresponding to plural communication standards. The communication unit 26 may communicate with a communication partner in accordance with a communication standard suitable for the communication partner (i.e., a communication standard to which the communication partner corresponds). The communication standard (system) includes, for example, infrared communication, visible light communication, Wi-Fi communication, and proximity wireless communication (e.g., near-field communication (NFC), etc.). Felica (registered trademark), Bluetooth (registered trademark), a radio frequency identifier (RFID), and the like are used for the proximity wireless communication. A wireless standard in another method may be surely used for the proximity wireless communication. The communication unit 26 may switch the communication standard or the frequency bandwidth depending on the communication partner, or may switch the communication standard or the frequency bandwidth depending on the surrounding environment. Communication standards will be described in detail later.

A UI unit 28 is a user interface unit and includes a display unit and an operation unit. The display unit is, for example, a display device such as a liquid crystal display. The display unit may be a flexible display. The operation unit is, for example, an input device such as a touch panel or a keyboard. A user interface serving as both a display unit and an operation unit (e.g., a touch type display or a device that electronically displays a keyboard or the like on a display) may be used. In addition, the UI unit 28 may include a sound collecting unit such as a microphone and a sound generating unit such as a speaker. In this case, information may be input to the terminal device 10 by voice, or information may be generated as voice.

The storage unit 30 is a storage device such as a hard disk or a memory (e.g., an SSD). The storage unit 30 stores coordinated function management information, various types of data, various programs (e.g., an operating system (OS), various application programs (application software), etc.), information indicating the addresses of other devices (device address information), information indicating the address of a server (server address information), information on the coordinated function, and the like. Surely, the information may be stored in separate storage devices or may be stored in a single storage device.

Hereinafter, the coordinated function management information will be described in detail. Coordinated function management information is information for managing coordinated functions that may be performed using one or more functions. The functions may be implemented by a device serving as hardware, or may be implemented by software (program). In other words, devices and software are used to execute the coordinated function. For example, the coordinated function is a function that can be executed by coordinating the terminal device 10 with another device. The coordinated function may be a function that can be executed by coordinating plural devices other than the terminal device 10 with each other, or a function that can be executed with one device or the terminal device 10. Further, the coordinated function may be a function that can be executed by coordinating plural pieces of software with each other, or a function that can be executed with a single piece of software. In addition, the coordinated function may be a function that can be executed by coordinating the terminal device 10 and the software, or a function that can be executed by coordinating one or more devices with one or more pieces of software.

The coordinated function may also be a function that is executable using a specific portion of the terminal device 10, a specific portion of the device, or a specific function of the software. For example, when a function is assigned to each portion of a device, the coordinated function may be a function that can be executed using the portion. In addition, when the software has multiple functions, the coordinated function may be a function that can be executed using some of the functions. The coordinated function may be a function that can be executed using a collective function composed of plural functions. A processing using the collective function is executed by executing plural functions simultaneously or sequentially.

For example, the coordinated function is determined for each communication standard used. As an example, the coordinated function management information is information that indicates an association among information indicating the communication standard, information for identifying a device used in the coordinated function (device identification information), and information indicating the content of the coordinated function that is executable using the device (coordinated function information). Further, when the software is used for the coordinated function, information indicating the communication standard, information for identifying software (software identification information), and information indicating the content of the coordinated function that is executable using the software (coordinated function information) are associated with each other. In addition, when both the device and the software are used for the coordinated function, information indicating the communication standard, device identification information, software identification information, and coordinated function information are associated with each other.

Examples of the device identification information include, for example, information indicating the device name, the device ID, and the device type, the type number of the device, information for managing the device (e.g., asset management information, etc.), information indicating a position where the device is installed (positional information of the device), an image connected to the device (device image), device address information, and the like. The device image is, for example, an external image representing the device. The external image may be an image that represents the outside of the device (e.g., a housing of the device), an image that represents a state in which the inside may be seen from the by opening the housing outside (e.g., an internal structure), or an image that represents a state in which the device is covered by a sheet for packing or the like. The device image may be an image that is generated by capturing the device (an image representing an external appearance of the device or an image representing the inside of the device), or an image that schematically represents the device (e.g., an icon, etc.). The device image may be a still image or a moving image. The data of the device image may be stored in the storage unit 30 or in an external device such as a device.

Examples of the software identification information include, for example, information indicating the software name, the software ID, and the software type, the type number of the software, information for managing the software, an image connected to the software (software image), and the like. The software image is, for example, an image representing the function of the software (e.g., an icon, etc.). The software image may be a still image or a moving image. The data of the software image may be stored in the storage unit 30 or in an external device such as a device.

When the device used for the coordinated function is updated (e.g., when the performance is updated), the coordinated function may be updated along with the update. This also updates the coordinated function management information. As a result, in some cases, the coordinated function that is not executable before the update becomes executable after the update, and on the contrary, the coordinated function that is executable before the update becomes inexecutable after the update. The coordinated function information indicating a coordinated function that becomes executable after the update is registered in the coordinated function management information, and the coordinated function information indicating a coordinated function that becomes inexecutable after the update is deleted from the coordinated function management information or registered as inexecutable information. The terminal device 10 may update the coordinated function management information by any timing, periodically, by a timing designated by a user, or the like. When the software used for the coordinated function is updated, the coordinated function is also updated along with the update.

The coordinated function may be a function that is executable by coordinating different plural devices with each other, or may be a function that is executable by coordinating the same plural devices with each other. Similarly, the coordinated function may be a function that is executable by coordinating different plural pieces of software with each other, or may be a function that is executable by coordinating the same plural pieces of software with each other. The coordinated function may be a function that is not available before the linkage.

The category of the concept of the coordinated function may include a merging function that enables the execution of a new function by coordinating plural devices or plural pieces of software with each other. For example, an extension display function as a merging function may be implemented by combining plural displays. As another example, a recording function as a merging function may be implemented by combining a television and a recorder. The recording function is a function of recording the image displayed on the television. In addition, a function of expanding a capturing area as a merging function may be implemented by combining plural cameras. The expanding function is, for example, a function of connecting the capturing areas of the respective cameras and capturing images. In addition, a conversation translating function (a function of translating a conversation via a telephone) as a merging function may be implemented by combining a telephone and a translator or translation software. In this manner, the category of the concept of the coordinated function includes a function that is executable by coordinating the same type of devices or software with each other, or a function that is executable by coordinating different types of devices or software with each other.

The storage unit 30 may store available function management information. The available function management information is information for managing functions available to each user. The available function management information is, for example, information indicating an association between information for identifying a user (user identification information) and function information indicating the functions available to the user (including coordinated function information). The functions available to the user are, for example, the functions provided free of charge to the user, the functions purchased by the user, and the like. The user identification information is, for example, user account information such as a user ID and a user name. By referring to the available function management information, functions available to each user are specified (identified). The available function management information is updated every time the function is provided to the user free of charge or for a fee.

The time at which the coordinated function is executed (execution time) may be set so that the execution time may be associated with each coordinated function in the coordinated function management information. The execution time is determined by the day of the week, the time zone (e.g., the time zone is set by the start time and the end time), the day, the week, the month, and the like. The execution time may be set by the user or may be predetermined. The execution time may be set individually for each coordinated function, or the same execution time may be set for all coordinated functions. In a case where an instruction to execute the coordinated function is given by the user, when the time at which the execution instruction is given (the day of the week, the time zone, etc.) is included in the execution time for the coordinated function, the coordinated function is executed. When the time at which the execution instruction is given is not included in the execution time, the coordinated function is not executed. In this case, assuming that the execution instruction has already been given, the coordinated function may be executed when the execution time has come. When the timer function for the coordinated function is set to ON, the coordinated function is executed according to the execution time described above. When the timer function is set to OFF, the coordinated function is executed automatically or according to the user's execution instruction, regardless of the execution time.

Further, each device may be directly or indirectly controlled by the terminal device 10. For example, the terminal device 10 may directly control the device by transmitting a control signal to the device to control an operation thereof, or control the device via a relay device by transmitting a control signal to the relay device. When the relay device is used, the relay device controls the device according to, for example, the control signal transmitted from the terminal device 10. The relay device that receives the control signal from the terminal device 10 may transmit the control signal to the other relay device so that the other relay device may control the device. Further, the device may be controlled by transmitting the control signal to the other relay device, or the device may be controlled via a server or the like by transmitting the control signal from the relay device to the server or the like. The relay device may be a so-called smart speaker (a device that has a wireless communication function and a speaker function), or a device that has a communication device but does not have a speaker function. The relay device may be installed indoors (e.g., on the floor, on the ceiling, on the top of a table, etc.) or outdoors. Also, the relay device may be a movable device (e.g., a self-propelled device). The device itself may function as a relay device.

The controller 32 has a function of controlling the operation of each portion of the terminal device 10. For example, the controller 32 executes various programs, controls communication by the communication unit 26, controls notification of information using the UI unit 28 (e.g., display of information, output of voice, etc.), receives the information that has been input using the UI unit 28, and the like. Further, the controller 32 includes a specifying unit 34.

The specifying unit 34 has a function of specifying an executable coordinated function by referring to the coordinated function management information. For example, when the communication unit 26 communicates with a device, the specifying unit 34 specifies a coordinated function that is executable using the communication standard and the device. The specifying unit 34 may specify a coordinated function that is executable using the software stored in the device or may specify a coordinated function that is executable using the software stored in another device connected to the device.

When the coordinated function is specified by the specifying unit 34, the controller 32 executes the coordinated function automatically or according to the user's execution instruction. The controller 32 may also control notification of the coordinated function. For example, the controller 32 may cause information on the coordinated function to be displayed on the display unit of the UI unit 28, or may output the information on the coordinated function as voice information. The information on the coordinated function is, for example, information including the content and name of the coordinated function. In addition, the controller 32 may control the notification of the coordinated function using a device other than the terminal device 10.

When the available function of the user is managed, the specifying unit 34 may receive the user identification information and specify a function associated with the user identification information in the available function management information stored in the storage unit 30. For example, the specifying unit 34 receives the identification information of the user logged in to the terminal device 10, specifies the function associated with the user identification information in the available function management information, and specifies the executable coordinated function described above. As a coordinated function associated with the user identification information in the available function management information, the coordinated function corresponding to the above-described executable coordinated function is a coordinated function that the user may use.

The coordinated function management information may be stored in an external device other than the terminal device 10 (e.g., a device or a server). In this case, the coordinated function management information may not be stored in the storage unit 30. Further, the specifying unit 34 may be provided in an external device. In this case, the specifying unit 34 may not be provided in the terminal device 10. That is, the management and specification of the coordinated function may be performed by the terminal device 10 or by an external device. When the specification processing is performed by the external device, the result of the processing (e.g., information on the specified coordinated function) may be transmitted from the external device to the terminal device 10 and displayed on the display unit of the UI unit 28, and the specified coordinated function may be executed.

Hereinafter, the information processing system according to the present exemplary embodiment will be described in more detail.

Each communication technology will be described with reference to FIG. 3. FIG. 3 illustrates the characteristics of the communication standard (method) (merits and demerits).

A main standard for a wireless communication technology with a frequency of 900 MHz is, for example, RFID. The merits of the standard include resistance to obstacles and a small interference frequency band, and the demerits thereof include a large antenna and a short communicable distance.

The main standards for a wireless communication technology with a frequency of 2.4 GHz are, for example, ZigBee (registered trademark), Bluetooth, and the like. The merits of the standards include power saving, a fast communication speed, and a small antenna, and the demerits thereof include more interference.

The main standards for a wireless communication technology with a frequency of 5 GHz are, for example, IEEE802.11a, MuLTEfire, and the like. The merits of the standards include a small interference frequency band and a fast communication speed, and the demerits thereof include vulnerability to obstacles.

The main standard for a wireless communication technology with a frequency of 6 GHz or higher is, for example, 5G (fifth generation mobile communication system). The merits of the standard include a fast communication speed, a large number of simultaneous connections of plural devices, and less delay, and the demerits thereof include high power consumption.

Further, some of the communication standards may correspond to plural frequency bands (e.g., Wi-Fi).

In addition, the merits of infrared communication include low power consumption and easy downsizing, and the demerits thereof include low visibility (infrared rays are not visible).

The merits of visible light communication include good visibility of the communication path (the communication path can be seen with the eyes from the visible light), and the demerits thereof include high directivity.

Proximity wireless communication (NFC) is meritorious in that pairing between plural devices is easy and communication is difficult to intercept because communication between devices is not possible unless the devices are in a close range. As a demerit thereof, communication is not available unless devices are in a close range.

When communicating with a communication partner through a wireless communication technology, for example, the communication standard illustrated in FIG. 3 is used.

Communication standards other than the communication standard illustrated in FIG. 3 may be surely used. For example, a communication standard such as a low power wide area (LPWA) may be used. As for LPWA, SIGFOX, LoRa, RPMA, Flexnet, NB-IoT, or the like may be used.

The communication unit 26 communicates with the communication partner in accordance with a communication standard having characteristics suitable for the surrounding environment and the communication partner. For example, the communication unit 26 may change the communication standard depending on the distance to the communication partner, the presence or absence of an obstacle, and the like.

Hereinafter, the coordinated function management information will be described in detail with reference to FIG. 4. FIG. 4 illustrates an example of a coordinated function management table as coordinated function management information. In the coordinated function management table, information indicating one or more communication standards, information indicating one or more devices as communication partners (device identification information), and information indicating the contents of the coordinated function executable using the one or more devices (coordinated function information) are associated with each other. Further, information indicating the communication standards, information indicating one or more pieces of software used for the coordinated function (software identification information), and information indicating the contents of the coordinated function executable using the one or more pieces of software may be associated with each other. In addition, information indicating the communication standards, information indicating a portion of the device, and information indicating the contents of the coordinated function executable using the portion may be associated with each other. Information indicating the communication standards, information indicating the specific function of the software, and information indicating the contents of the coordinated function executable using the function may also be associated with each other.

When communication is established between the terminal device 10 and the device, the specifying unit 34 specifies the coordinated function associated with the communication standard and the communication partner device by referring to the coordinated function management table. The controller 32 may execute the linkage function automatically or according to the execution instruction of the user, or notify the user of the linkage function.

The coordinated function is determined based on, for example, the characteristics of the communication standard used. For example, the coordinated function is determined based on the communication speed of the communication standard used. Specifically, a communication standard with a slow communication speed is associated with a coordinated function that requires a small amount of data to be exchanged, and a communication standard with a fast communication speed is associated with a coordinated function that requires a large amount of data to be exchanged. Further, the coordinated function may be determined based on characteristics such as the communicable distance of the communication standard used, the interference frequency band, the power consumption, the number of simultaneously connectable devices, directivity, visibility, and ease of connection.

Hereinafter, an example of the contents registered in the coordinated function management table will be described in detail.

Proximity wireless communication (NFC) as a communication standard, a cash register as a device, and a settlement function as a coordinated function are associated with each other. The cash register includes a communication unit (reader) that may transmit and receive signals (data) by proximity wireless communication. When the terminal device 10 (communication unit 26) communicates with the cash register (communication unit) by proximity wireless communication, the specifying unit 34 uses the terminal device 10 and the cash register to specify a settlement function as a coordinated function that is executable by proximity wireless communication. More specifically, when the communication unit 26 receives signals generated by the communication unit of the cash register (signals by proximity wireless communication) and establishes proximity wireless communication between the communication unit 26 and the cash register, the specifying unit 34 specifies the settlement function as the executable coordinated function. The settlement function is a function of making settlement using proximity wireless communication and is implemented by, for example, software for settlement. The software is installed, for example, on the terminal device 10. When proximity wireless communication is established between the terminal device 10 and the cash register, the terminal device 10 (communication unit 26) receives information from the cash register (e.g., information indicating establishment of communication, device identification information for identifying the cash register, etc.) by proximity wireless communication. Information on the user and the terminal devices 10 (e.g., user identification information, terminal identification information for identifying the terminal device 10, etc.) may be transmitted from the terminal device 10 to the cash register by proximity wireless communication.

Even when the terminal device 10 (communication unit 26) communicates with another device by proximity wireless communication, the specifying unit 34 uses the terminal device 10 and the other device to specify the coordinated function that is executable by proximity wireless communication similarly to the above-described case.

In addition, Wi-Fi as a communication standard, a Wi-Fi router as a device, and a downloading function as a coordinated function are associated with each other. When the terminal device 10 (communication unit 26) communicates with the Wi-Fi router by Wi-Fi communication, the specifying unit 34 uses the terminal device 10 and the Wi-Fi router to specify a downloading function as a coordinated function that is executable by Wi-Fi communication. More specifically, when the communication unit 26 receives signals generated by the Wi-Fi router (signals by Wi-Fi communication) and Wi-Fi communication is established between the communication unit 26 and the Wi-Fi router, the specifying unit 34 specifies the downloading function as an executable coordinated function. The downloading function is a function of downloading data using Wi-Fi communication. Examples of data include, for example, image data, video data, music data, and other data (e.g., document data, table data, graphic data, etc.). In addition, when Wi-Fi communication is established between the terminal device 10 and the Wi-Fi router, the terminal device 10 (communication unit 26) receives information from the Wi-Fi router (e.g., information indicating establishment of communication, device identification information for identifying the Wi-Fi router, etc.) by Wi-Fi communication. Information on the user and the terminal device 10 may be transmitted from the terminal device 10 to the Wi-Fi router by Wi-Fi communication.

Even when the terminal device 10 (the communication unit 26) communicates with another device by Wi-Fi communication, the specifying unit 34 uses the terminal device 10 and the other device to specify a coordinated function that is executable by Wi-Fi communication.

Wi-Fi and Bluetooth as communication standards, the Wi-Fi router and the headphone as devices, and music data streaming function as a coordinated function are associated with each other. The headphone includes a communication unit that may transmit and receive signals (data) by Bluetooth. The music data streaming function is a function of transmitting music data from the server to the terminal device 10 by Wi-Fi communication, transmitting the music data from the terminal device 10 to the headphone by Bluetooth communication, and reproducing the music data by the headphone. When the terminal device 10 (communication unit 26) communicates with the Wi-Fi router by Wi-Fi communication and communicates with the headphone by Bluetooth communication, the specifying unit 34 uses the terminal device 10, the Wi-Fi router, and the headphone to specify a music data streaming function as a coordinated function that is executable by Wi-Fi and Bluetooth. More specifically, when the communication unit 26 receives signals generated by the Wi-Fi router (signals by Wi-Fi communication), Wi-Fi communication is established between the communication unit 26 and the Wi-Fi router, and Bluetooth communication is established between the communication unit 26 and the headphone, the specifying unit 34 specifies the music data streaming function as the executable function. Further, when Wi-Fi communication is established between the terminal device 10 and the Wi-Fi router, the terminal device 10 (communication unit 26) receives information from the Wi-Fi router (e.g., information indicating establishment of communication, device identification information for identifying the Wi-Fi router, etc.) by Wi-Fi communication. Similarly, when Bluetooth communication is established between the terminal device 10 and the headphone, the terminal device 10 (communication unit 26) receives information from the headphone (e.g., information indicating establishment of communication, device identification information for identifying the headphone, etc.) by the Bluetooth communication. Information on the user and the terminal device 10 may be transmitted from the terminal device 10 to the Wi-Fi router by Wi-Fi communication or may be transmitted from the terminal device 10 to the headphone by Bluetooth communication.

Further, Wi-Fi and the wired communication as communication standards, the Wi-Fi router and the multifunction device as devices, and a downloading and printing function as a coordinated function are associated with each other. The multifunction device is a device having image forming functions such as a printing function, a scanning function, and a copying function. The downloading and printing function is a function of downloading document data and printing the data by the multifunction device. When the terminal device 10 (communication unit 26) communicates with the Wi-Fi router by Wi-Fi communication and communicates with the multifunction device by wired communication (e.g., communication using a cable such as a LAN cable), the specifying unit 34 uses the terminal device 10, the Wi-Fi router, and the multifunction device to specify a downloading and printing function as a coordinated function that is executable by Wi-Fi and wired communication. More specifically, when the communication unit 26 receives signals generated by the Wi-Fi router (signals by Wi-Fi communication), Wi-Fi communication is established between the communication unit 26 and the Wi-Fi router, the terminal device 10 and the multifunction device are connected each other via a cable, and wired communication is established between the terminal device 10 and the multifunction device, the specifying unit 34 specifies the above-described downloading and printing function as an executable coordinated function. In addition, when Wi-Fi communication is established between the terminal device 10 and the Wi-Fi router, the terminal device 10 (communication unit 26) receives information from the Wi-Fi router (e.g., information indicating establishment of communication, device identification information for identifying the Wi-Fi router, etc.) by Wi-Fi communication. Similarly, when wired communication is established between the terminal device 10 and the multifunction device, the terminal device 10 (communication unit 26) receives information from the multifunction device (e.g., information indicating establishment of communication, device identification information for identifying the multifunction device, etc.) by wired communication (via a cable). Information on the user and the terminal device 10 may be transmitted from the terminal device 10 to the Wi-Fi router by Wi-Fi communication or may be transmitted from the terminal device 10 to the multifunction device by wired communication.

The above-described coordinated function is only one example, and other coordinated functions may be registered in the coordinated function management table. In the example illustrated in FIG. 4, one coordinated function is associated with a combination of the communication standard and the device or software, but plural linkages functions may be associated therewith.

The coordinated function may be a function that is executable using an Internet of Things (IoT) device. The coordinated function may be used in, for example, a connected home (a system in which devices such as home appliances are connected via a network using the IoT technology). In this case, the devices may be connected via a specific server, or without a specific server. Further, the device and the software may be linked with each other via the IFTTT to execute the coordinated function. That is, the contents of the coordinated function may be such that when a triggering event occurs in a device or software, other devices or software will perform an action (processing). Further, the contents of the coordinated function may be such that when a triggering event occurs in a file, an action (processing) will be performed on another file. In addition, a function of performing a further different action when an action serves as another trigger may also fall within the category of the coordinated function of the present exemplary embodiment. Moreover, a function of coordinating plural Web services and an application programming interface (API) linkage of coordinating plural systems, services, or the like using the API may be included in the category of the coordinated function of the present exemplary embodiment.

As for the device, the portions of the device may be used. For example, when a device has plural functions and the function is assigned to each portion of the device, a coordinated function using the portion of the device may be defined. As a specific example, it is assumed that a printing function is assigned to the main body unit of the multifunction device, a scanning function is assigned to the reading unit of the multifunction device (e.g., a portion corresponding to a document cover, a document glass, or an automatic document feeder), and a post-processing function (e.g., a stapling function, etc.) is assigned to a post-processing device of the multifunction device. When the scanning function is used as a function included in the coordinated function, the reading unit of the multifunction device may be designated as a portion of the device required for the coordinated function. In addition, an aggregate function integrated in a block unit such as robotics process automation (RPA) may be used as software.

The coordinated function registered in the coordinated function management table may be created and registered in advance or by the user.

The software used for the coordinated function may be software installed in the terminal device 10, or software installed in an external device such as a device. The coordinated function may be executed using plural pieces of software installed on both the terminal device 10 and the external device.

Also, the terminal device 10 may update the coordinated function management table by any timing, periodically, by a timing designated by a user or an administrator, or the like. When the coordinated function management table is stored in an external device such as a device, the coordinated function management table may be updated by the external device. With the update, a new coordinated function may be added to the coordinated function management table, the content or configuration of the coordinated function already registered in the coordinated function management table may be changed, and a coordinated function may be deleted from the coordinated function management table. For example, when a function of the device registered in the coordinated function management table or a function of the software is updated, the content of the coordinated function using the updated function may be updated along with the update. In addition, the coordinated function that is not available before the update may become available after the update, and on the contrary, the coordinated function that is available before the update may become unavailable after the update.

Hereinafter, the processing according to the present exemplary embodiment will be described in detail with specific examples.

Specific Example 1

Specific example 1 will be described. For example, in the example illustrated in FIG. 1, when the terminal device 10 (communication unit 26) communicates with the cash register 12 by proximity wireless communication (NFC), the specifying unit 34 uses the terminal device 10 and the cash register 12 to specify a settlement function as a coordinated function that is executable by proximity wireless communication by referring to the coordinated function management table. The controller 32 causes information on the settlement function to be displayed on the display unit of the UI unit 28. For example, the controller 32 causes information on the settlement function to be displayed on the display unit by executing the software for settlement.

FIG. 5 illustrates an example of such a display. When the settlement function is specified as an executable coordinated function, the controller 32 causes a screen 36 to be displayed on the display unit of the UI unit 28 and the information on the settlement function to be displayed on the screen 36. The settlement function is a settlement function by electronic money using proximity wireless communication, and the controller 32 causes a message for asking the user whether the settlement is executed to be displayed on the screen 36. When the user presses the YES button on the screen 36, the controller 32 executes settlement using electronic money. Thus, the settlement from the terminal device 10 to the cash register 12 is executed using proximity wireless communication. When settlement by the settlement function is completed, the controller 32 may cause a message indicating that the settlement has been completed to be displayed on the display unit. Further, the controller 32 may execute the settlement using electronic money without displaying a message for asking the user whether the settlement is executed. When the user presses the NO button on the screen 36, the controller 32 causes the screen 36 not to be displayed without executing the settlement function.

When the terminal device 10 is placed in an environment where plural communication standards may be used at the same time, the specifying unit 34 may determine the priority of each coordinated function in accordance with the priority of each communication standard. The controller 32 may notify information on each coordinated function in accordance with the priority of each coordinated function, or may control the execution of a coordinated function having the highest priority. The priority may be predetermined, determined based on a relationship among plural communication standards that become available at the same time, or determined by the user. For example, the priority of a communication standard having a short communicable distance may be set to be a value higher than the priority of a communication standard having a longer communicable distance. The priority of the opposite relationship may be set. Also, the priority may be determined based on the communication speed. The priority of a communication standard with a fast communication speed may be set to a value higher than the priority of a communication standard with a slower communication speed. The priority of the opposite relationship may be set.

For example, when the terminal device 10 is placed in an environment where both proximity wireless communication and Wi-Fi communication are available at the same time, that is, when the communication unit 26 receives signals by proximity wireless communication and signals by Wi-Fi communication, the specifying unit 34 determines the priority of the coordinated function based on the priority of each of the proximity wireless communication and Wi-Fi communication. For example, in proximity wireless communication and Wi-Fi communication, the priority of proximity wireless communication with a shorter communication distance may be set to a "first place," and the priority of Wi-Fi communication may be set to a "second place." In this case, the priority of the coordinated function using proximity wireless communication becomes higher than the priority of the coordinated function using Wi-Fi communication. The controller 32 causes the information on the coordinated function using proximity wireless communication to be displayed on the display unit with a higher priority (e.g., higher level) than the information on the coordinated function using Wi-Fi communication. Further, the controller 32 may execute the coordinated function using proximity wireless communication with a high priority, automatically or in accordance with the execution instruction by the user. In addition, when the coordinated function using both proximity wireless communication and Wi-Fi communication is registered in the coordinated function management table, the specifying unit 34 may specify such a coordinated function as a coordinated function having the highest priority. In this case, the information on the coordinated function is caused to be displayed on the display unit in the order of the coordinated function using both proximity wireless communication and Wi-Fi communication, the coordinated function using proximity wireless communication, and the coordinated function using Wi-Fi communication. Surely, the above-described priorities are only an example, and different priorities may be set.

Specific Example 2

Specific example 2 will be described. For example, in the example illustrated in FIG. 1, when the terminal device 10 (communication unit 26) communicates with a router 14 by Wi-Fi communication, the specifying unit 34 uses the terminal device 10 and the router 14 to specify a downloading function as a coordinated function that is executable by Wi-Fi communication by referring to the coordinated function management table. The controller 32 causes information on the downloading function to be displayed on the display unit of the UI unit 28. For example, the controller 32 causes the information on the downloading function to be displayed on the display unit by executing the software for downloading.

Figure 6:
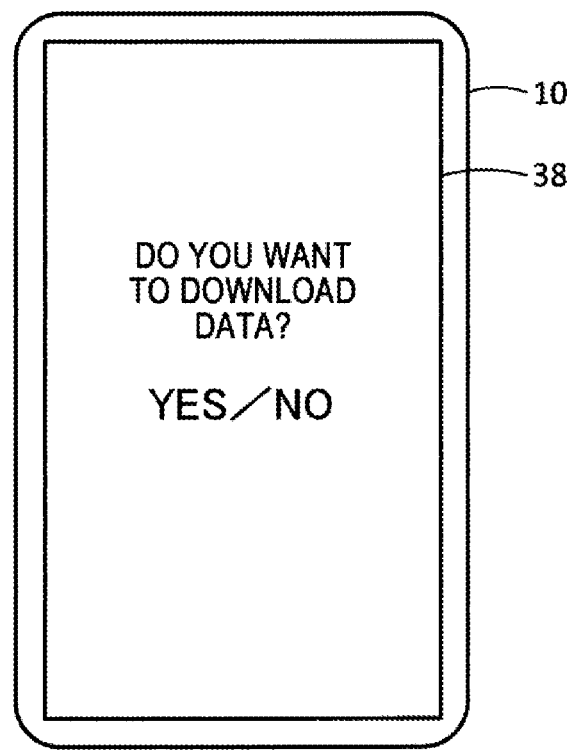
FIG. 6 is a diagram illustrating a screen.

FIG. 6 illustrates an example of such a display. When the downloading function is specified as an executable coordinated function, the controller 32 causes a screen 38 to be displayed on the display unit of the UI unit 28 and causes the information on the downloading function to be displayed on the screen 38. The downloading function is a function of downloading data using, for example, Wi-Fi communication, and the controller 32 causes a message for asking the user whether the downloading is executed to be displayed on the screen 38. When the user presses the YES button on the screen 38, the controller 32 causes a screen for selecting the data to be downloaded to be displayed on the display unit. For example, the controller 32 causes a screen for selecting a storage location of data (e.g., a folder or a directory) to be displayed on the display unit, and when the storage location is selected by the user, the controller 32 causes a list of data stored in the storage location to be displayed on the display unit. The storage location of the data is provided in, for example, a server, a device, or the like. When the data to be downloaded is selected by the user, the controller 32 starts downloading the data. Thus, the data selected by the user is downloaded to the terminal device 10 via the router 14 from the storage location by Wi-Fi communication. When the downloading is completed, the controller 32 may cause a message indicating that the downloading has been completed to be displayed on the display unit. Further, the controller 32 may execute downloading the previously selected data without displaying a message for asking the user whether the downloading is executed. When the user presses the NO button on the screen 38, the controller 32 causes the screen 38 not to be displayed without executing the downloading function.

Specific Example 3

Specific example 3 will be described. In the specific examples 1 and 2 described above, communication is performed between the terminal device 10 and one device. However, in the specific example 3, communication is performed between the terminal device 10 and plural devices, and a coordinated function using such communication is executed. In addition, plural communication standards are used. Hereinafter, the specific example 3 will be described in detail with reference to FIG. 7.

Figure 7:
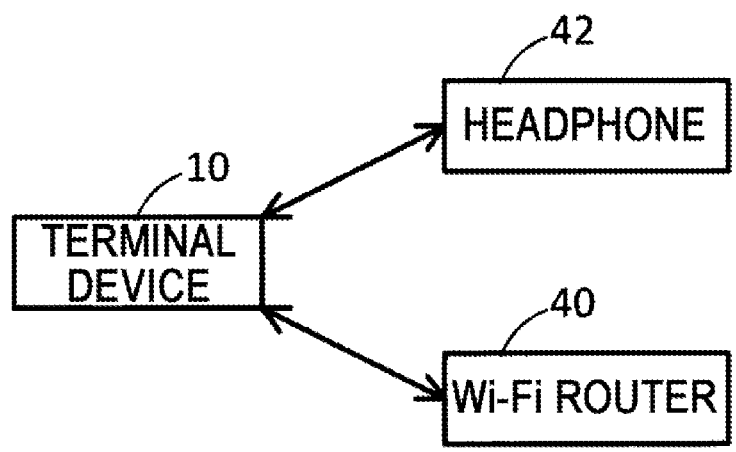
FIG. 7 is a block diagram illustrating a specific example of the configuration of the information processing system.

For example, as illustrated in FIG. 7, when the terminal device 10 (communication unit 26) communicates with the Wi-Fi router 40 by Wi-Fi communication and communicates with the headphone 42 by Bluetooth communication, the specifying unit 34 uses the terminal device 10, the Wi-Fi router 40, and the headphone 42 to specify a music data streaming function as a coordinated function that is executable by Wi-Fi communication and Bluetooth communication by referring to the coordinated function management table. The controller 32 causes information on the music data streaming function to be displayed on the display unit of the UI unit 28. For example, the controller 32 causes the information on the music data streaming function to be displayed on the display unit by executing the software for streaming.

Figure 8:
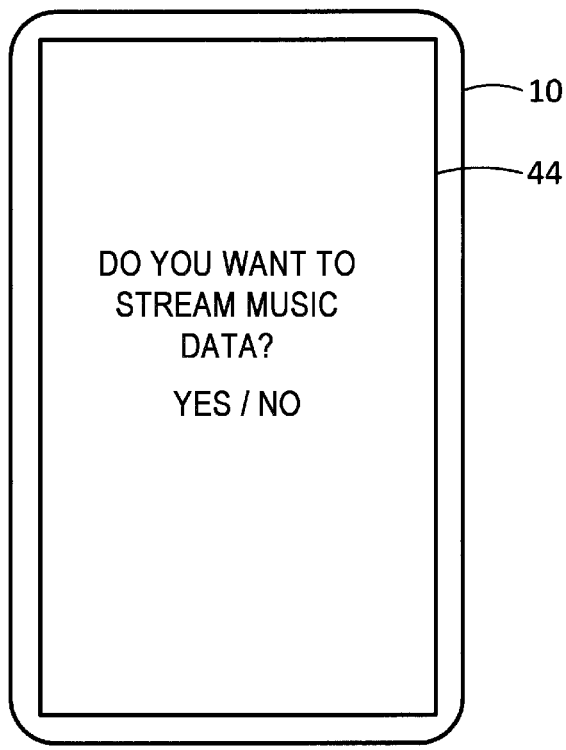
FIG. 8 is a diagram illustrating a screen.

FIG. 8 illustrates an example of such a display. When the music data streaming function is specified as an executable coordinated function, the controller 32 causes a screen 44 to be displayed on the display unit of the UI unit 28, and causes the information on the music data streaming function to be displayed on the screen 44. The music data streaming function is a function of downloading music data using, for example, Wi-Fi communication and reproducing the music data by the headphone 42. The controller 32 causes a message for asking the user whether the streaming is executed to be displayed on the screen 44. When the user presses the YES button on the screen 44, the controller 32 performs communication with the server that provides a music delivery service via, for example, the Wi-Fi router 40, and causes a list of the provided music data to be displayed on the display unit. When music data is selected by the user, the controller 32 starts streaming the music data. Thus, the music data selected by the user is downloaded from the server to the terminal device 10 via the Wi-Fi router 40 by Wi-Fi communication. The controller 32 transmits the music data to the headphone 42 by Bluetooth communication while downloading the music data, and reproduces the music data by the headphone 42. The controller 32 may cause a message indicating that reproduction is in progress while the music is being reproduced to be displayed on the display unit, and cause a message indicating the end of the reproduction to be displayed on the display unit when the reproduction is ended. Further, the controller 32 may execute streaming the previously selected music data without displaying a message for asking the user whether the streaming is executed. When the user presses the NO button on the screen 44, the controller 32 causes the screen 44 not to be displayed without executing the music data streaming function.

As described above, when the terminal device 10 is placed in an environment where plural communication standards are available, a coordinated function using the plural communication standards is notified. That is, when the terminal device 10 is placed in an environment where Wi-Fi communication is available and communication with a headphone corresponding to the Bluetooth standard is available, a music data streaming function is specified as a coordinated function that is executable using the device and the communication standard, and the notification and execution of the function is controlled.

Specific Example 4

Specific example 4 will be described. Only wireless communication is used in the specific examples 1 to 3 described above, but wired communication is used in the specific example 4. Hereinafter, the specific example 4 will be described in detail with reference to FIG. 9.

Figure 9:
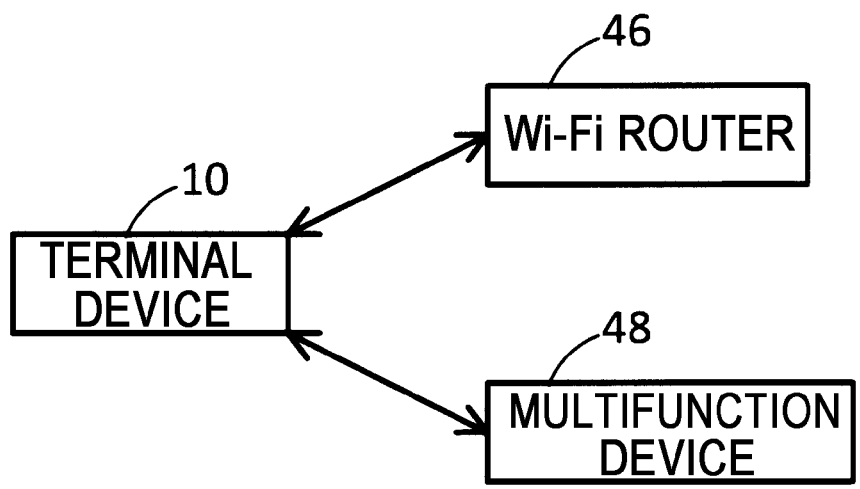
FIG. 9 is a block diagram illustrating a specific example of the configuration of the information processing system.

For example, as illustrated in FIG. 9, when the terminal device 10 (the communication unit 26) communicates with the Wi-Fi router 46 by Wi-Fi communication and communicates with a multifunction device 48 by wired communication (e.g., e-communication using a cable such as a LAN cable), the specifying unit 34 uses the terminal device 10, the Wi-Fi router 46, and the multifunction device 48 to specify a downloading and printing function as a coordinated function that is executable according to Wi-Fi communication and wired communication by referring to the coordinated function management table. The controller 32 causes information on the downloading and printing function to be displayed on the display unit of the UIT unit 28. For example, the controller 32 causes the information on the downloading and printing function to be displayed on the display unit by executing the software for downloading and printing.

Figures 10, 11:
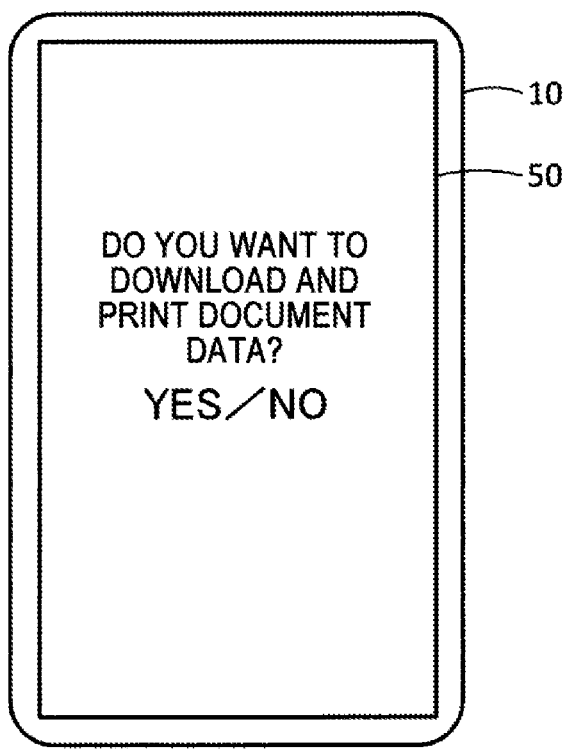
FIG. 10 is a diagram illustrating a screen.
FIG. 11 is a diagram illustrating a coordinated function management table.

FIG. 10 illustrates an example of such a display. When the downloading and printing function is specified as the executable function, the controller 32 causes a screen 50 to be displayed on the display unit of the UI unit 28, and causes the information on the downloading and printing function to be displayed on the screen 50. The downloading and printing function is a function of downloading document data using, for example, Wi-Fi communication and printing the document data by the multifunction device. The controller 32 causes a message for asking the user whether the downloading and printing is executed to be displayed on the screen 50. When the user presses the YES button on the screen 50, the controller 32 causes a screen for selecting the document data to be downloaded to be displayed on the display unit. For example, the controller 32 causes a screen for selecting a storage location of data (e.g., a folder or a directory) to be displayed on the display unit, and causes a list of the document data stored in the storage location to be displayed on the display unit when the storage location is selected by the user. The storage location of data is provided in, for example, a server, a device, or the like. When the document data to be printed is selected by the user, the controller 32 starts downloading the document data. Thus, the document data selected by the user is downloaded from the storage location to the terminal device 10 via the Wi-Fi router 46, transmitted from the terminal device 10 to the multifunction device 48 via a cable, and printed by the multifunction device 48. When the printing is completed, the controller 32 may cause a message indicating that the printing has been completed to be displayed on the display unit. Further, the controller 32 may cause a screen for setting the printing conditions to be displayed on the display unit at a timing before or after the downloading of the document data. When the printing conditions are set by the user on the screen, the controller 32 transmits information indicating the printing conditions together with the document data to the multi-function device 48. The multifunction device 48 prints the document data in accordance with the printing conditions. In addition, the controller 32 may execute printing the previously selected document data without displaying a message for asking the user whether the downloading and the printing are executed. Further, image data, table data, graphic data, or the like may be as print data. When the user presses the NO button on the screen 50, the controller 32 causes the screen 50 not to be displayed without executing the downloading and printing function.

When Wi-Fi communication is established between the terminal device 10 and the Wi-Fi router 46, a cable is connected to both the terminal device 10 and the multifunction device 48 so that communication is established via the cable between the terminal device 10 and the multifunction device 48. In this case, the specifying unit 34 may specify the downloading and printing function as the executable coordinated function, and the controller 32 may control the notification and execution of the downloading and printing function. That is, when the user connects the terminal device 10 and the multifunction device 48 via a cable in an environment in which Wi-Fi communication is available, the downloading and printing function is notified. It is assumed that an operation of connecting the cable to the multifunction device 48 by the user indicates the intention to use the multifunction device 48. Therefore, when such an operation is performed, the coordinated function according to the user's intention is notified by notifying the downloading and printing function.

Specific Example 5

Specific example 5 will be described. Plural coordinated functions may be associated with each other for a combination of communication standards and a device or software. In this case, when communication in accordance with one or more communication standards is established between the terminal device 10 and one or more devices, the controller 32 causes information on the plural coordinated functions to be displayed on the display unit.

A specific example will be described with reference to FIG. 4. In the example illustrated in FIG. 4, when Wi-Fi communication is used as a communication standard and a Wi-Fi router is used as a device, the downloading function is specified as an executable coordinated function. As a coordinated function other than the downloading function, for example, a data transmission function may be specified as an executable coordinated function. The data transmission function is a function of transmitting data from the terminal device 10 to another device (e.g., a server, another terminal device, etc.) by Wi-Fi communication. When the terminal device 10 communicates with the Wi-Fi router by Wi-Fi communication, the specifying unit 34 specifies both the downloading function and the data transmission function as executable coordinated functions. The controller 32 causes information on the downloading function (e.g., a name) and information on the data transmission function (e.g., a name) to be displayed on the display unit of the UI unit 28. When the user selects any one of the downloading function and the data transmission function, the controller 32 executes the selected coordinated function.

Further, when the data transmission function is selected, the controller 32 causes a screen for selecting the data to be transmitted to be displayed on the display unit. For example, the storage location of the data is displayed on the screen, and when the storage location is selected by the user, the data stored in the storage location is displayed. In addition, the controller 32 causes a screen for selecting a transmission destination to be displayed on the display unit. The transmission destination is, for example, a server, a device, another terminal device, or the like. When the user selects the data to be transmitted and the transmission destination, the controller 32 transmits the data to the transmission destination via the Wi-Fi router by Wi-Fi communication.

Further, in the example illustrated in FIG. 4, when Wi-Fi communication and wired communication are used as communication standards, and a Wi-Fi router and a multifunction device are used as devices, the downloading and printing function is specified as an executable coordinated function. As a coordinated function other than the downloading and printing function, for example, a scanning and transmission function may be specified as an executable coordinated function. The scanning and transmission function is a function of generating image data by scanning a document by the multifunction device and transmitting the image data to devices other than the multifunction device. The transmission destination is a server, a device, a terminal device 10, another terminal device, or the like, and may be determined by the user or in advance. When the execution instruction of the scanning and transmission function is given, image data is generated by scanning the document by the multifunction device, and the image data is transmitted from the multifunction device to the terminal device 10 by wired communication and further transmitted from the terminal device 10 to the transmission destination. When the terminal device 10 communicates with the Wi-Fi router by Wi-Fi communication and the terminal device 10 and the multifunction device are connected via a cable to establish wired communication, the specifying unit 34 specifies both the downloading and printing function and the scanning and transmission function as executable coordinated functions. The controller 32 causes the information on the downloading and printing function and information on the scanning and transmission function to be displayed on the display unit of the UI unit 28. The coordinated functions in which the execution instructions are given by the user are executed.

Specific Example 6

Specific example 6 will be described. In specific example 6, plural communication standards are used. For example, plural communication standards with different standards may be used. As a specific example, a first communication standard with a slow communication speed (e.g., proximity wireless communication) is used when a user logs into a device, and a second communication standard with a faster communication speed (e.g., Wi-Fi communication) is used to communicate larger volumes of data. For example, when proximity wireless communication is established between the terminal device 10 and the device, the controller 32 performs a login processing to the device. For example, user account information, authentication information, or the like is used for the login processing. When the login is successful and Wi-Fi communication is established between the terminal device 10 and the device, the controller 32 performs data transmission and reception using Wi-Fi communication. By using the second communication standard for data transmission and reception, the time required for data transmission and reception becomes shorter than when using the first communication standard.

In addition, the first communication standard may be a communication standard with a short communicable distance (e.g., proximity wireless communication), and the second communication standard may be a communication standard with a longer communicable distance (e.g., Wi-Fi communication). By using the second communication standard for data transmission and reception, it is possible to transmit and receive data over a wider range (long distance range) than when using the first communication standard.

Further, plural same or same type of communication standards may be used. For example, plural communication standards with a relatively fast communication speed may be used. Thus, it is possible to transmit and receive data more quickly.

As described above, according to the present exemplary embodiment, the coordinated function in accordance with one or more communication standards is provided to the user. In the above-described specific example, the controller 32 may perform notification of the coordinated function when the power source of the terminal device 10 is turned on. For example, when the power source of the terminal device 10 is turned on, the specifying unit 34 specifies a coordinated function that is associated with a combination of the communication standard of the signals received by the communication unit 26 and the communication partner device. The controller 32 causes information on the coordinated function to be displayed on the display unit. In this manner, at a timing when the power source of the terminal device 10 is turned on, the user is notified of the coordinated function that is executable under the environment at that time.

In the above-described specific example, the controller 32 may notify the coordinated function at the first timing when communication is established between the terminal device 10 and another device. Also, the controller 32 may continuously notify the coordinated function over a predetermined time based on the first timing, and may not notify the coordinated function after the time has elapsed.

In a case where communication is disconnected during the execution of the coordinated function, the controller 32 may stop execution of the coordinated function that is executable using the communication. In a case where the communication is disconnected when the coordinated function is not executed, the controller 32 may cause a message indicating that the coordinated function executable using the communication may not be executed to be displayed on the display unit. The message may also indicate the reason why the coordinated function may not be executed (e.g., disconnection of the communication).

Hereinafter, modifications will be described.

Modification 1

Modification 1 will be described. In modification 1, the coordinated function is changed in accordance with the communication standard and positional information used. The positional information is, for example, information indicating the position of the terminal device 10. The positional information may be information indicating the position of the device as a communication partner of the terminal device 10. Hereinafter, modification 1 will be described in detail with reference to FIG. 11.

FIG. 11 illustrates an example of a coordinated function management table according to the first modification. In the coordinated function management table according to modification 1, as an example, information indicating one or more communication standards, information indicating one or more devices as communication partners (device identification information), positional information, and information indicating the contents of the coordinated function that is executable using the one or more devices at the position indicated by the positional information (coordinated function information) are associated with each other. The positional information is information indicating a country, a province, a prefecture, a municipality, a state, a latitude, a longitude, and the like. Similarly to the above-described exemplary embodiment, information indicating one or more pieces of software used in the coordinated function (software identification information), information indicating a portion of the device, and information indicating a specific function of the software may be associated with each other.

Hereinafter, an example of the contents registered in the coordinated function management table according to modification 1 will be described in detail.

Proximity wireless communication (NFC) as a communication standard, a cash register as a device, a position, a settlement function as a coordinated function, and a translation function are associated with each other. When the terminal device 10 (communication unit 26) communicates with the cash register by proximity wireless communication, the specifying unit 34 uses the terminal device 10 and the cash register to specify the settlement function as a coordinated function that is executable by proximity wireless communication. In addition, the specifying unit 34 changes the settlement function according to the current position of the terminal device 10. For example, when the current position of the terminal device 10 is included in Japan, the specifying unit 34 specifies the function of making settlement using the Japanese yen as an executable function. The controller 32 executes the settlement using the Japanese yen automatically, or when the user gives instructions to execute the settlement. In the meantime, when the current position of the terminal device 10 is included in the United States of America, the specifying unit 34 specifies the function of making settlement using the U.S. dollar as an executable function. The controller 32 executes the settlement using the U.S. dollar automatically, or when the user gives instructions to execute the settlement. Further, the controller 32 acquires the positional information of the terminal device 10 by using a global positioning system (GPS) or the like.

When the language used for notification of information on the coordinated function (display or voice output) is different from the language set in the terminal device 10, the controller 32 may also execute the translation function. In this case, the controller 32 uses the language set in the terminal device 10 to translate the information on the coordinated function, and notifies the translated information. The used language used may be set in advance or by the user. For example, it is assumed that the language set in the terminal device 10 is Japanese, the position of the terminal device 10 is included in the United States of America, and the coordinated function is notified in the United States of America. In this case, when the information provided to the terminal device 10 by the device used for the coordinated function is expressed in English, the controller 32 executes the translation function to translate the information into the language set in the terminal device 10 (in this case, Japanese), and notifies the translated information. In this manner, the controller 32 may execute the translation function according to the position of the terminal device 10.

According to modification 1, even when the same communication standard is used, the coordinated function to be notified or executed is changed depending on the position of the terminal device 10.

Modification 2

Modification 2 will be described. In modification 2, communication is performed between the terminal device 10 and plural devices, and the coordinated function is changed in accordance with the order of connection between the terminal device 10 and each of the devices. Hereinafter, modification 2 will be described in detail with reference to FIG. 12.

Figures 12, 13:
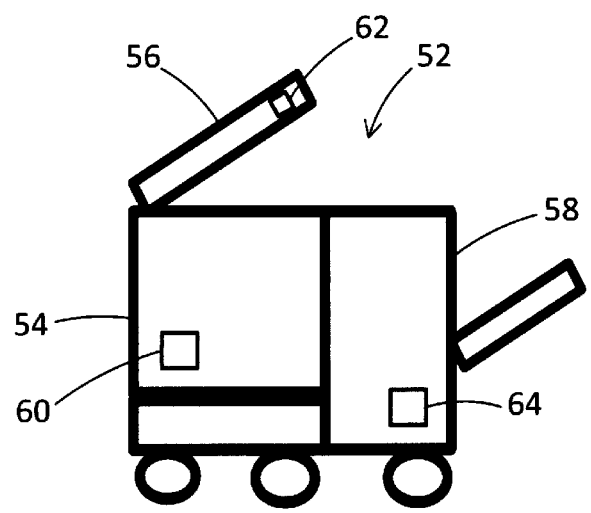
FIG. 12 is a diagram illustrating a coordinated function management table.
FIG. 13 is a diagram schematically illustrating the external appearance of a multifunction device.

FIG. 12 illustrates an example of a coordinated function management table according to modification 2. As an example, in the coordinated function management table according to modification 2, information indicating one or more communication standards, information indicating plural devices as communication partners (device identification information), and information indicating the contents of the coordinated function that is executable using the plural devices (coordinated function information) are associated with each other. In modification 2, the priority of the coordinated function is changed according to the order of connection between the terminal device 10 and the each of the devices (the order of starting communication). The controller 32 controls the notification and execution of the respective coordinated functions according to the priority. Hereinafter, a specific example will be described in detail.

As an example, Wi-Fi and wired communication as communication standards, the Wi-Fi router and the multifunction device as devices, and the downloading and printing function and the scanning and transmission function as coordinated functions are associated with each other. For example, when the terminal device 10 and the Wi-Fi router are first connected by Wi-Fi communication to start Wi-Fi communication, and then, the terminal device 10 and the multifunction device are connected with each other by a cable such as a LAN cable, the priority of the downloading and printing function becomes a "first place," and the priority of the scanning and transmission function becomes a "second place." In this case, the controller 32 causes the information on the downloading and printing function to be displayed on the display unit with a higher priority (e.g., higher level) than the information on the scanning and transmission function. In this manner, since the flow of data handled corresponds to (matches) the flow of the user's work, the coordinated function that is assumed to be used by the user is provided to the user with a higher priority than other coordinated functions. That is, the processing of the downloading and printing function is performed in the order of (1) downloading data using a Wi-Fi router, (2) transmitting the data to a multifunction device by wired communication, and (3) printing the data by the multifunction device. The flow of the processing corresponds to the order of (1) connection between the terminal device 10 and the Wi-Fi router, and (2) connection between the terminal device 10 and the multifunction device. In this manner, since the flow of data in the coordinated function corresponds to (matches) the flow of the connection work, the coordinated function of the user who has performed the work may be given a higher priority.

Contrary to the above-described connection order, when the terminal device 10 and the multifunction device are first connected with each other via a cable, and then the terminal device 10 and the Wi-Fi router are connected by Wi-Fi communication to start Wi-Fi communication, the priority of the scanning and transmission function becomes a "first place," and the priority of the downloading and printing function becomes a "second place." In this case, the controller 32 causes the information on the scanning and transmission function to be displayed on the display unit with a higher priority (e.g., higher level) than the information on the downloading and printing function. The processing of the scanning and transmission function is performed in the order of (1) scanning data by a multifunction device, (2) transmitting scanned data to the terminal device 10 by wired communication, and (3) transmitting scanned data using the Wi-Fi router. The flow of the processing corresponds to the order of (1) connection between the terminal device 10 and the multifunction device, and (2) connection between the terminal device 10 and the Wi-Fi router. Therefore, the intended coordinated function of the user who has performed the connection work may be provided with a higher priority.

Further, modifications 1 and 2 may be combined. That is, the coordinated function may be changed depending on the connection order and the position of the terminal device 10.

Modification 3

Modification 3 will be described. In modification 3, a function is assigned to each portion of the device, and a communication unit (hereinafter, referred to as "device communication unit") is associated with each portion. When communication is established between the terminal device 10 and a part of the device, a coordinated function that is executable using the portion and the communication is notified. Hereinafter, modification 3 will be described with reference to FIG. 13.

FIG. 13 schematically illustrates an external appearance of the multifunction device. The multifunction device 52 includes, for example, a main body unit 54, a reading unit 56, and a post-processing device 58. The main body unit 54 is assigned, for example, a printing function and a copying function. The reading unit 56 is, for example, an automatic document feeder, and is assigned a scanning function. The post-processing device 58 is, for example, a stapler or a punching unit, and the post-processing device 58 is assigned a stapling function, a punching function, and the like.

Further, the main body unit 54 is provided with a device communication unit 60, the reading unit 56 is provided with a device communication unit 62, and the post-processing device 58 is provided with a device communication unit 64. Each device communication unit is a communication interface and has a function of communicating with other devices. For example, each device communication unit communicates with other devices in accordance with any one of the communication standards illustrated in FIG. 3. Each device communication unit may surely communicate with other devices in accordance with a communication standard not illustrated in FIG. 3.

Hereinafter, modification 3 will be described in detail with specific examples. For example, when communication is established between the terminal device 10 and the device communication unit 64 provided in the post-processing device 58, the specifying unit 34 uses the terminal device 10 and the post-processing device 58 to specify the executable coordinated function. For example, a coordinated function of transmitting the image data captured using a camera provided in the terminal device 10 from the terminal device 10 to the multifunction device 52, printing the image data, and executing a stapling processing on the printed matter is specified as an executable coordinated function. The controller 32 causes the information on the coordinated function to be displayed on the display unit of the UI unit 28. In addition, the controller 32 may execute the coordinated function automatically or according to the execution instruction of the user.

The multifunction device 52 is provided with a sheet tray for storing paper and supplying paper to the main body unit 54. A device communication unit may be provided in the sheet tray. In this case, when communication is established between the terminal device 10 and the device communication unit provided in the sheet tray, the specifying unit 34 specifies a coordinated function that is executable using the terminal device 10 and the sheet tray. For example, when the number of sheets of paper stored in the sheet tray is detected by a sensor and the remaining number of sheets is less than a threshold value, a coordinated function of transmitting an alert signal from the sheet tray to the terminal device 10 is specified as an executable coordinated function.

According to modification 3, it is possible to individually notify or execute a coordinated function using a specific portion of the device.

As an example other than the above-described modification 3, the coordinated function may be changed depending on the use frequency of the portion of the device. For example, a coordinated function of detecting the use frequency of the portion of a device as a communication partner (the total number of times of use, the number of times of use per unit time, etc.) and executing a failure prediction based on the detection result may be specified as an executable coordinated function. When the coordinated function is executed, the use frequency of the portion of the device as a communication partner is detected, and information indicating the detection result is transmitted from the multifunction device to the terminal device 10. The controller 32 executes a failure prediction program to predict a failure at the position based on the detection result. An abrasion amount and the like of the position may be calculated based on the detection result. The failure prediction program may be transmitted from the multifunction device to the terminal device 10, may be installed in the terminal device 10 in advance, or may be transmitted from the server to the terminal device 10.

In addition, a coordinated function of executing an operation in accordance with the detection result may be specified as an executable coordinated function. The coordinated function is, for example, a function of driving the relevant portion so that a load corresponding to the use frequency is generated. Specifically, the coordinated function is a function of driving the relevant portion in such a manner that the load becomes smaller as the use frequency increases. For example, when a large amount of printing is performed continuously at high speeds, and the printing is continued under the condition, there is a possibility that excessive heat may be generated and an excessive load may be applied to parts such as motors. To avoid this, a coordinated function that is executable as the use frequency becomes higher is changed to a coordinated function of driving the relevant portion so that the load becomes smaller.

Further, modifications 1 and 3 may be combined. That is, the coordinated function may be changed depending on the position of the device and the position of the terminal device 10. Modifications 2 and 3 may also be combined. That is, the coordinated function may be changed depending on a part of the device and the connection order. Modifications 1, 2 and 3 may also be combined. That is, the linkage function may be changed depending on the portion of the device, the position of the terminal device 10, and the connection order.

Other Exemplary Embodiments

In the above-described exemplary embodiment and modifications, the terminal device 10 corresponds to plural communication standards, but may correspond to only one communication standard. In this case, the specifying unit 34 specifies a coordinated function that is executable using the terminal device 10 and the communication partner device by communication according to the communication standard. Also, the specifying unit 34 may specify a coordinated function corresponding to the position of the terminal device 10, as in the case of the above-described modification 1. That is, the executable coordinated function may be changed depending on the position of the terminal device 10. The executable coordinated function may be surely changed depending on the position of the communication partner device.

The above-described terminal device 10 is implemented by, for example, cooperation between hardware and software. Specifically, the terminal device 10 includes one or more processors such as a CPU (not illustrated). The function of each portion of the terminal device 10 is implemented by the one or more processors reading and executing the program stored in the storage device (not illustrated). The above-described program is stored in a storage device via a recording medium such as a CD or a DVD, or via a communication path such as a network. As another example, each portion of the terminal device 10 may be implemented by hardware resources such as, for example, a processor, an electronic circuit, or an application specific integrated circuit (ASIC). Devices such as memories may be used for such an implementation. As still another example, each portion of the terminal device may be implemented by a digital signal processor (DSP), a field programmable gate array (FPGA), or the like.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a plurality of communication chips configured to communicate with another device; and
a controller configured to control execution of a coordinated function when the communication chip performs communication with the another device in accordance with a specific communication standard, wherein the coordinated function is executable with the another device and the information processing apparatus,
wherein the controller is configured to change the coordinated function in accordance with a use frequency of a part of the another device,
the use frequency is the number of times of use the part of the another device as a communication device per unit time,
wherein the coordinated function is executable with the information processing apparatus and a plurality of other devices, and the controller is configured to change priority of functions of the coordinated function in accordance with an order of connection between the information processing apparatus and each of the plurality of other devices,
wherein the priority of the functions of the coordinated function corresponds to an order of the functions of the coordinated function being executed,
wherein the functions of the coordinated function comprises at least one first function and at least one second function,
wherein when the order of connection is in a first order, the priority of the at least one first function is higher than the priority of the at least one second function, and the at least one first function is executed before the at least one second function being executed, and
wherein when the order of connection is in a second order, the priority of the at least one second function is higher than the priority of the at least one first function, and the at least one second function is executed before the at least one first function being executed.

2. The information processing apparatus according to claim 1, wherein
the controller is configured to change the coordinated function in accordance with the specific communication standard.

3. The information processing apparatus according to claim 1, wherein
the controller is configured to control the execution of the coordinated function in accordance with the specific communication standard and positional information.

4. The information processing apparatus according to claim 3, wherein
the positional information is information indicating a position of the information processing apparatus.

5. The information processing apparatus according to claim 1, wherein
the coordinated function is a function that uses a plurality of communication standards.

6. The information processing apparatus according to claim 5, wherein
the controller is configured to control the execution of the coordinated function when the information processing apparatus is placed in an environment where the plurality of communication standards are available.

7. The information processing apparatus according to claim 5, wherein
one of the plurality of communication standards is a wired communication standard, and
the controller is further configured to control notification of the coordinated function when the wired communication with the another device is available and to control the execution of the coordinated function when an execution instruction is given by a user after the notification.

8. The information processing apparatus according to claim 1, wherein
the controller is further configured to control notification of the coordinated function and to control the execution of the coordinated function when an execution instruction is given by a user after the notification.

9. The information processing apparatus according to claim 8, wherein
the controller is configured to control the notification of the coordinated function when a power source of the information processing apparatus is turned on.

10. The information processing apparatus according to claim 1, wherein
the coordinated function is a function that uses a part of the another device.

11. The information processing apparatus according to claim 1, wherein
when communication is established between the communication chip and a device communication chip connected to a part of the another device, the coordinated function is executable with the part of the another device.

12. A non-transitory computer readable medium storing a program causing a computer to function as a controller that controls execution of a coordinated function when communication is performed between a terminal device and another device in accordance with a specific communication standard, wherein the terminal device includes a plurality of communication chips configured to communicate with the another device, and the coordinated function is executable with the terminal device and the another device,
wherein the controller is configured to change the coordinated function in accordance with a use frequency of a part of the another device,
the use frequency is the number of times of use the part of the another device as a communication device per unit time,
wherein the coordinated function is executable with the terminal device and a plurality of other devices, and the controller is configured to change priority of functions of the coordinated function in accordance with an order of connection between the terminal device and each of the plurality of other devices,
wherein the priority of the functions of the coordinated function corresponds to an order of the functions of the coordinated function being executed, wherein the functions of the coordinated function comprises at least one first function and at least one second function, wherein when the order of connection is in a first order, the priority of the at least one first function is higher than the priority of the at least one second function, and the at least one first function is executed before the at least one second function being executed, and wherein when the order of connection is in a second order, the priority of the at least one second function is higher than the priority of the at least one first function, and the at least one second function is executed before the at least one first function being executed.

* * * * *